Figure 8:
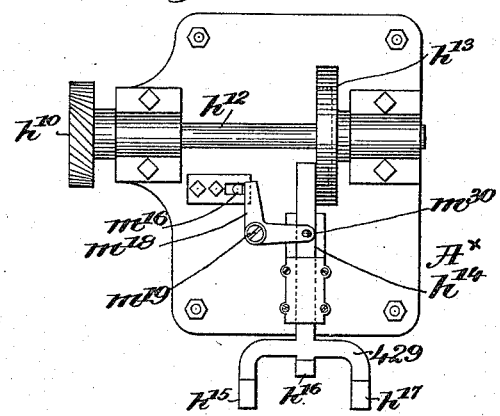

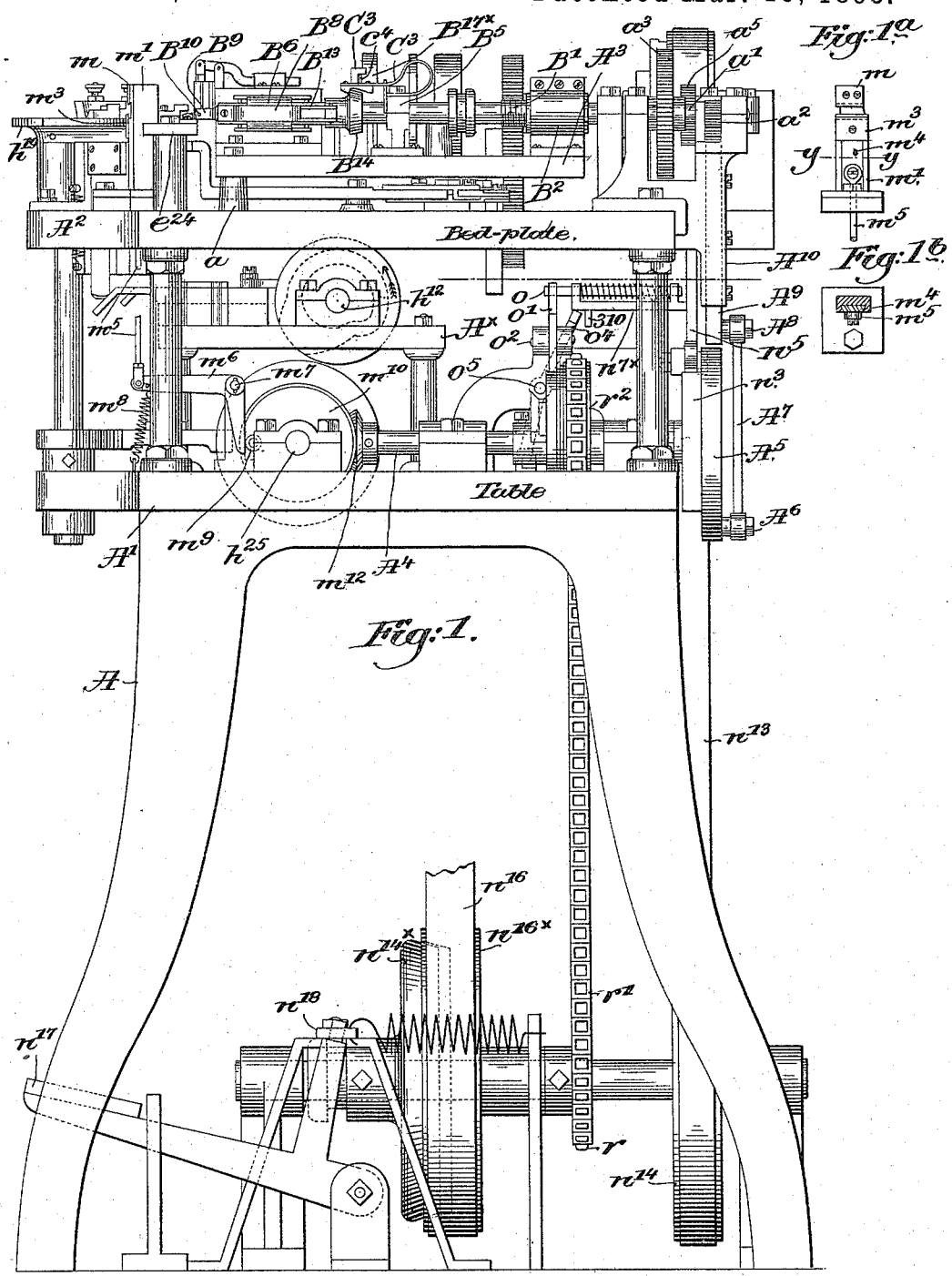

(No Model.) 6 Sheets—Sheet 2.
S. L. PRATT.
MACHINE FOR PROVIDING LACES WITH WIRE TIPS.
No. 535,957. Patented Mar. 19, 1895.
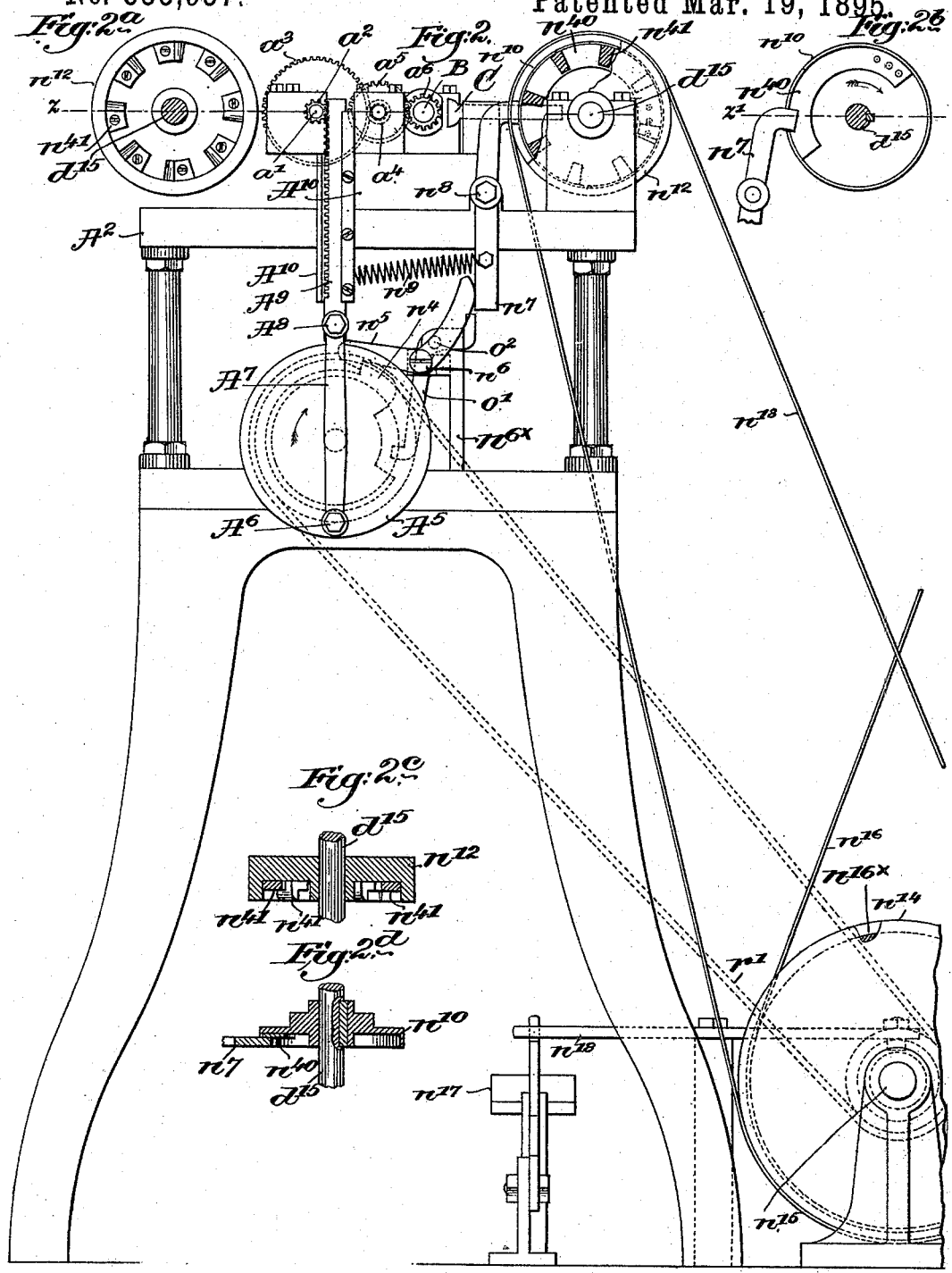

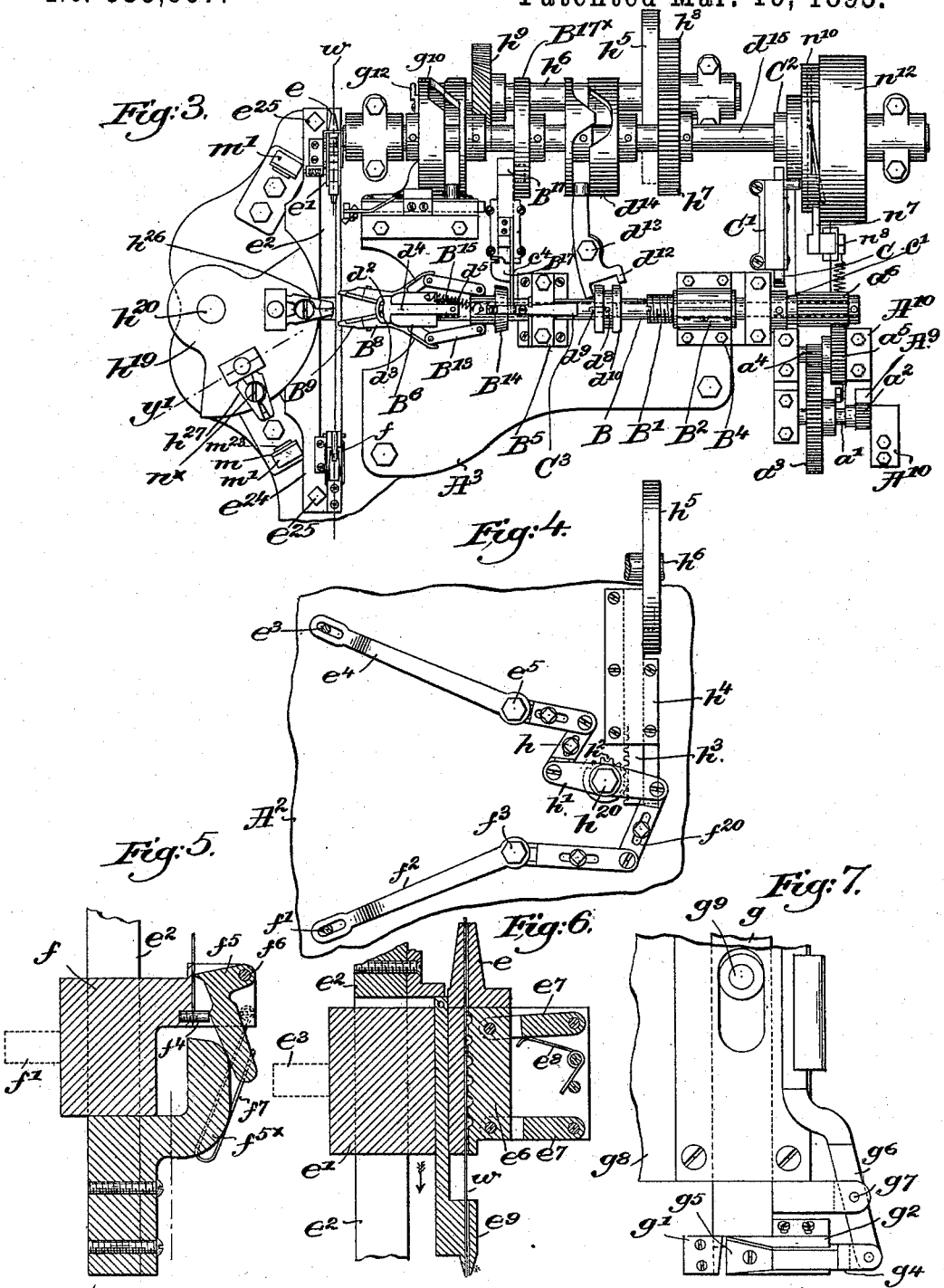

(No Model.) 6 Sheets—Sheet 4.

S. L. PRATT.
MACHINE FOR PROVIDING LACES WITH WIRE TIPS.

No. 535,957. Patented Mar. 19, 1895.

Witnesses.
Edward F. Allen.
Thomas J. Drummond.

Inventor:
Samuel L. Pratt,
by Crosby & Gregory, attys (No Model.) 6 Sheets—Sheet 5.
S. L. PRATT.
MACHINE FOR PROVIDING LACES WITH WIRE TIPS.
No. 535,957. Patented Mar. 19, 1895.
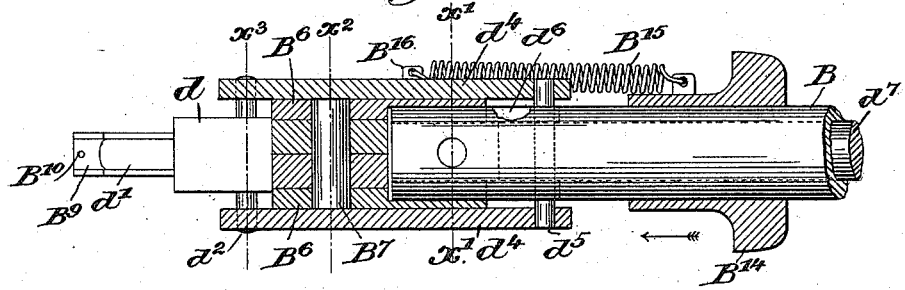
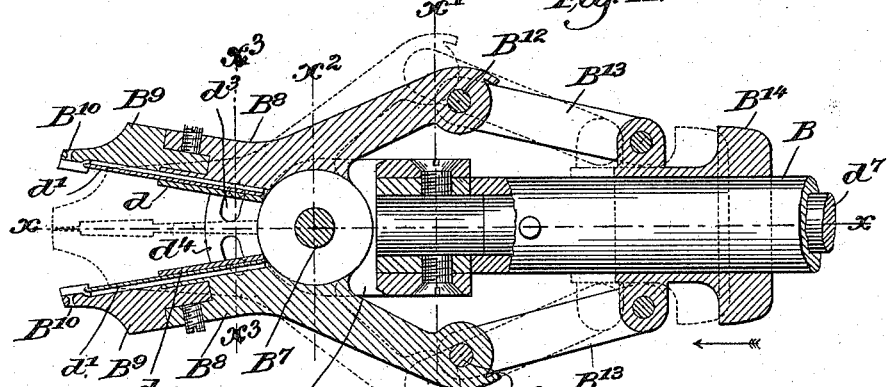
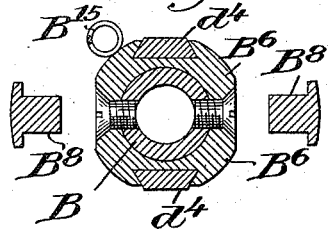
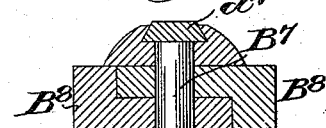
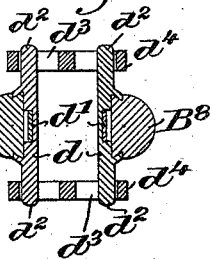
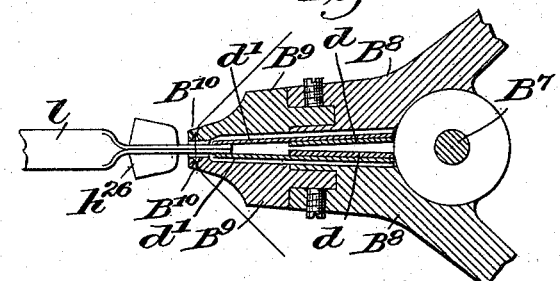
Witnesses.
Edward F. Allen.
Thomas J. Drummond.
Inventor:
Samuel L. Pratt,
by Crosby Gregory, attys.
THE NORRIS PETERS CO., PHOTO-LITHO., WASHINGTON, D. C.

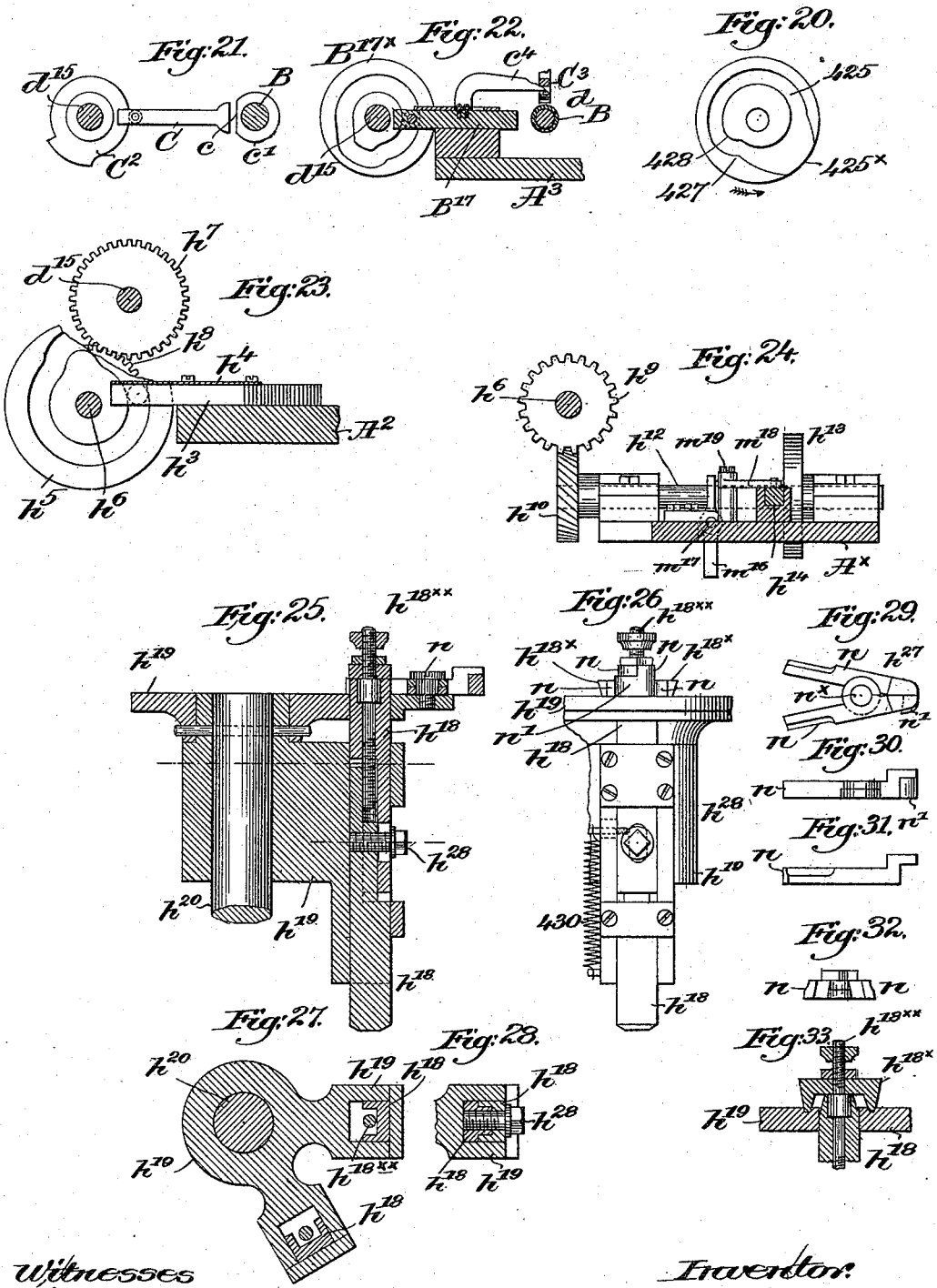

UNITED STATES PATENT OFFICE.

SAMUEL LEE PRATT, OF HINGHAM, MASSACHUSETTS.

MACHINE FOR PROVIDING LACES WITH WIRE TIPS.

SPECIFICATION forming part of Letters Patent No. 535,957, dated March 19, 1895.

Application filed October 18, 1894. Serial No. 526,241. (No model.)

*To all whom it may concern:*

Be it known that I, SAMUEL LEE PRATT, of Hingham, county of Plymouth, State of Massachusetts, have invented an Improvement in Machines for Providing Lacings with Wire Tips, of which the following description, in connection with the accompanying drawings, is a specification, like letters and figures on the drawings representing like parts.
Lacings for shoes, corsets, &c., are finished at their ends in a variety of ways, as by the employment of sheet metal and by wire.

The machine herein to be described has been devised for the purpose of automatically finishing the ends of lacings with wire tips.

In my improved machine, the wire taken from a reel by a feeding device has its end thrust through the lacing and also preferably through a twisting device, and the free end of the wire is thereafter caught by a wire pulling device and drawn farther through the lacing and from the feeding device, the latter at such time sliding back on the wire to its starting point, after which the wire is preferably automatically cut off for the length desired for the twisted end. The lacing is held in a clamp, and the wire having been cut off, the twisting device holding the wire each side the lacing is rotated to twist the wire together from its junction with the lacing, leaving a close twisted tapered end or tip. During the twisting operation the lacing is held firmly by a suitable clamp close to the point where the wire is doubled in the lacing. The twisting device is shown as connected to a rotating spindle, means being provided to change the relative positions of the clamp and twisting device during the twisting operation, the change being effected preferably by moving the spindle longitudinally.

I have devised means for bending the wire into staple form after having been thrust through the lacing, said operation being performed by a bender sliding longitudinally in the twisting device, it acting to bend the wire sharply at a right angle close to each side the lacing, to thereby define the starting of the twist close to the lacing in order that the wire may clasp the lacing very firmly and hold it from the point where the wire enters the lacing.

The twisting device is provided with a spring controlled jaw-closer which keeps the jaws pressed properly one toward the ends of the other to insure the proper twisting of the wire for the tip or end.

Figure 9:
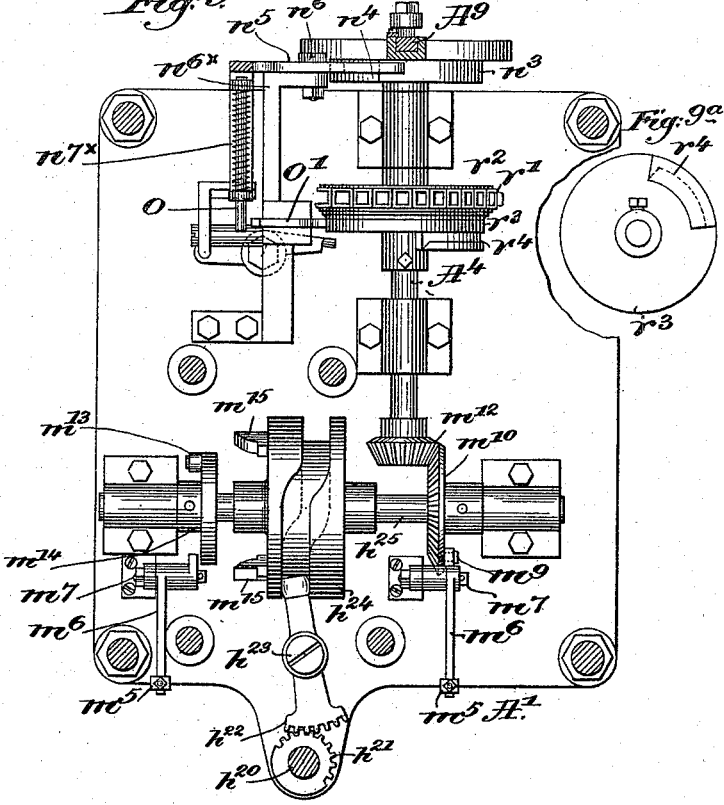
Figure 10:
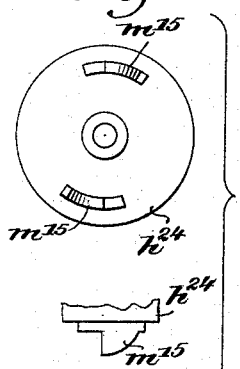

Figure 1 is a right hand side elevation of a machine embodying my invention. Fig. $1^a$ is a detail showing the mechanism for cutting off the twisted end of the tip to established length. Fig. $1^b$ is a section in the line $y$, Fig. $1^a$. Fig. 2 is a partial rear end elevation thereof, the pulley $n^{12}$ being broken out. Figs. $2^a$ and $2^b$ are details showing the co-operating contiguous faces of a clutch pulley parts $n^{12}$, $n^{10}$. Figs. $2^c$ and $2^d$ are details to be referred to, the figures being sections in the lines $z$ and $z'$, Figs. $2^a$ and $2^b$. Fig. 3 is a top or plan view of the machine. Fig. 4 is a detail below the cap-plate to show the devices employed for reciprocating the carriages having to do with feeding the wire. Fig. 5 is a longitudinal section through the wire drawing carriage. Fig. 6 is a section through the wire feeding carriage. Fig. 7 is a detail enlarged, of the cutting mechanism for severing the wire into proper lengths for tips. Fig. 8 is a detail showing the devices employed for opening and closing the jaws of the lacing clamp employed to hold the ends of the lacings while the tips are being applied thereto. Fig. 9 is a top view of the table A' and parts carried thereby. Fig. $9^a$ shows cam hub $r^3$ detached. Fig. 10 is a detail of the cam $h^{24}$. Fig. 11 is a longitudinal section through the twisting device, the full lines showing it open and the dotted lines, closed. Fig. 12 is a section in the dotted line $x$ Fig. 11. Fig. 13 is a section in the dotted line $x'$ Figs. 11 and 12. Fig. 14 is a section in the dotted line $x^2$. Fig. 15 is a section in the dotted line $x^3$; Fig. 16, a detail showing the jaws of the twisting device with the bender for bending the central part of the tip. Fig. 17 shows the tip wire bent by the bender into the form it will be made to assume preparatory to twisting the wire to form the tip. Fig. 18 shows the twisting operation commenced next the bend of the wire. Fig. 19 shows part of a lacing with a completed tip. Figs. 20 to 33 inclusive represent details to be referred to.

The frame-work consists essentially of legs A, upon which is mounted a table A', which, through suitable columns erected thereon, supports a bed-plate $A^2$, the latter having sustained above it by suitable posts $a$, a top-plate $A^3$. The table $A'$ has suitable bearings for the main shaft $A^4$ having fast upon it at one end a crank $A^5$ provided with a crank pin $A^6$ over which is fitted a link $A^7$, in turn fitted to a stud $A^8$ on a rack $A^9$, which is reciprocated up and down intermittingly with periods of rest between each motion, in a suitable guide-way made in a stand $A^{10}$ secured to the bed-plate $A^2$. The stand $A^{10}$ contains bearings for a short shaft $a'$, upon which is fixed a pinion $a^2$ engaged by said rack, said shaft having a toothed gear $a^3$, which, see Fig. 3, engages a pinion $a^4$ on a second shaft having bearings in said frame, said shaft having also applied to it a toothed gear $a^5$, which engages the long pinion $a^6$ fast on the twisting spindle B, to be described, said pinion being made long in order that the engagement of the gears $a^5$, $a^6$, may be maintained and cause the rotation of the spindle even when the latter is being moved longitudinally as will be described, the said gearing imparting rotation to said spindle in one direction while the wire for the tip is being twisted firmly together by the twisting device to be described, and then the spindle is revolved in the opposite direction back to its starting point, as will be described.

The spindle B has fast upon it a threaded collar $B'$ which is embraced by a threaded nut $B^2$, preferably made as a two-part stand, having its feet bolted by bolts $B^4$, see Fig. 3, to the top-plate $A^3$. The spindle B slides back and forth in a bearing $B^5$, suitably bolted to the top-plate.

The spindle B at its front end has attached to or made as part of it a head $B^6$ which serves to sustain the stud $B^7$ constituting the fulcrum for the jaws of the twisting device or grippers $B^8$, herein represented as having detachable nose pieces $B^9$ provided with holes at $B^{10}$ which are in line when the jaws are closed upon a lacing, said holes serving to receive through them the wire $w$ on its way into and beyond the lacing, preparatory to being twisted into the form of a tip. The inner ends of the jaws $B^8$ receive pins $B^{12}$ which join them to links $B^{13}$ in turn jointed to a collar $B^{14}$ loose on the spindle B, said collar being connected by a spring $B^{15}$ to a pin or projection $B^{16}$ on the head $B^6$, said spring normally acting to pull the collar in the direction of the arrow next it in Figs. 11 and 12, to thus effect the closing of the jaws of the twisting device upon the lacing end next to be tipped.

The collar $B^{14}$ is shown as rounded, and at suitable times after the spring has acted to close the twisting device upon the lacing, a slide $B^{17}$, see Figs. 3 and 22, is thrown forward with its preferably rounded end against the rounded rear end of said collar, thus moving the same positively in the direction to cause the jaws of the twisting device to grip the lacing positively while the wire $w$ is being inserted through the holes $B^{10}$, as will be described, the correct alignment of the holes with the point of the wire being insured by the action of a plunger C guided in a stand $C'$ secured to the upper side of the top-plate, see Figs. 3 and 21, said plunger having a roller or other stud which is acted upon by a cam $C^2$ which causes the plunger to contact with a flat or secant face $c$ of a collar $c'$ fast on the spindle B. The slide $B^{17}$ has at one side a roller or other stud, see Fig. 22, which enters a suitable cam groove in a cam disk $B^{17\times}$, fast on an intermittingly rotated shaft $d^{15}$.

The stand $B^5$ has erected upon it a catch $C^3$ composed as herein shown, of a spring arm having an attached notched block shaped to constitute a hook, see Fig. 1, to engage and stop the collar $B^{14}$ just about as the spindle B, then being rotated in one direction by the rack $A^9$, and being slid longitudinally by the threaded nut $B^2$, comes into position to have the jaws of the twisting device clamped upon the end of a lacing, the engagement of the catch with said collar serving to quickly open the jaws of the twisting device in order that it may straddle the lacing end preparatory to being closed thereon.

As soon as the spindle B has been moved sufficiently forward and the jaws have been opened to get well about the lacing end, the catch $C^3$ is acted upon by a cam finger $c^4$, see Figs. 3 and 22, attached in a suitable manner as by screws to the slide $B^{17}$, said cam finger serving to lift the spring catch and let the spring $B^{15}$ act as described to quickly close the jaws of the twisting device upon the lacing.

The jaws of the twisting device, see Fig. 11, are suitably grooved at their inner faces to receive slide blocks $d$, to which are suitably secured the benders $d'$, said slides having pin-like projections $d^2$, which enter cam slots $d^3$ in guide-bars $d^4$ preferably dove-tailed in cross section and fitted to slide in dove-tailed guide-ways formed in the head $B^6$ of the spindle, said guide-bars being joined at their inner ends by a pin $d^5$, extended through and free to slide back and forth in a diametrical slot $d^6$ in said spindle B, said pin $d^5$ being connected to a rod $d^7$ located within the center of the spindle B, the rod having at its opposite end a second pin $d^8$, see Fig. 3, extended outwardly through other longitudinal slots $d^9$ in said spindle and entering a collar $d^{10}$ surrounding said spindle loosely, said collar at times being acted upon by a pusher $d^{12}$ pivoted at $d^{13}$ on the top-plate, the outer end of said pusher having a roller or other stud which enters a cam slot in a hub $d^{14}$ fast on the intermittingly rotating shaft $d^{15}$, said pusher being moved to slide said collar on the spindle B toward the twisting device just after the jaws of said twisting device have been closed upon the lacing and the wire constituting the tip has been thrust through the hole $B^{10}$ and through said lacing, the collar by its movement in the direction stated, causing the bars $d^4$ carrying the benders $d'$ to be moved forward to thrust said benders between the said jaws then holding the lacing with the tip wire through it, the benders acting upon said tip wire then normally straight, and forcing the same into the space between the jaws of the lacing clamp, bending said wire into the position shown in Fig. 17, and, the wire having been bent, the collar $d^{10}$ will be again acted upon by the pusher $d^{12}$ and be drawn back quickly in the opposite direction to pull said benders from between the lacing clamp and back into their normal position in the twisting device, so that the twisting operation can take place, the spindle B being moved backwardly during the twisting of the wire $w$, to form the tip, said wire during the twisting operation being held at its central or bent part by the clamp holding the lacing, and as the wire is being twisted into spiral form, to make the tip shown at the right in Fig. 19, the twisting device is rotated and is also drawn away from the lacing clamp and the ends of the wire finally escape from the holes $B^{10}$.

The wire to be used for the lacing tip will be taken from a suitable reel, not shown, and thence be drawn through any usual wire-straightening device, not necessary to be herein shown, the straightened wire $w$ being led into and through a guide $e$, see Figs. 3 and 6, the latter figure showing the guide enlarged. The guide $e$ is connected to and forms part of what I shall designate as the wire feeding device, it consisting essentially of a carriage $e'$ adapted to slide in a suitable guide-way $e^2$ formed in a track $e^{24}$ held in place by bolts $e^{25}$, see Fig. 3, said carriage having a downwardly extended pin $e^3$, see Fig. 4, which enters a slot in a feed lever $e^4$ pivoted at $e^5$ on the bed-plate $A^2$.

The carriage $e'$ has a clamp $e^6$ preferably serrated at its under side and supported upon links $e^7$, one of which is acted upon by a suitable spring $e^8$, which normally serves to keep the clamp $e^6$ down upon the wire $w$, so that when the carriage is moved in the direction shown by the arrow in Fig. 6 with the end of the wire extended a short distance through the nose $e^9$, and fitting rather closely the hole therein, said end is thrust, as stated, through the hole $B^{10}$ in one of the jaws of the twisting device, then through the lacing, then between said jaws, and through the hole $B^{10}$ in the other jaw, at which point the end of the wire is grasped by the wire-pulling device, which I will now describe.

The wire-pulling device, see Figs. 3 and 5, consists essentially of a carriage $f$ having a downwardly projecting post or pin $f'$ which enters a slot in an arm $f^2$ pivoted at $f^3$ on the bed $A^2$, said carriage being free to slide back and forth in the slot $e^2$ referred to in the guide-bar. The carriage $f$ has a stop pin $f^4$, which abuts against the free end of the wire thrust through the lacing by the wire-feeding device, and said wire is pushed well under a dog $f^5$ pivoted at $f^6$ on an upright portion of the carriage, said dog being acted upon by a spring $f^7$ to insure the hold of the dog on the wire.

The wire having been thrust under the dog to the stop and caught by the dog, the levers $e^4$ and $f^2$ are quickly moved in the opposite direction, causing both carriages to be moved away from the twisting device, the dog $f^5$ then acted upon by the spring $f^7$ holding onto the end of the wire and drawing the latter farther through the lacing and the holes $B^{10}$, the clamp $e^6$ of the feeding device, as the carriage $e'$ is being moved backwardly, sliding freely over the wire yet held by the dog $f^5$. As stated, the dog $f^5$ engaging the end of the wire, positively draws the same through the twisting device and the lacing until a sufficient portion of the wire has been drawn through the lacing to form one-half of the tip, at which time the carriage $f$ having arrived back into its normal position, the said dog meets an opening device $f^{5\times}$ which turns the dog $f^5$ about its pivot $f^6$ to effect the release of the wire, which done, the wire is severed near the nose $e^9$ by a suitable wire-cutting-device, shown enlarged in Fig. 7, the same consisting essentially of a slide bar $g$ having at its outer end a stationary cutter $g'$, said slide having also at its outer end a suitable guide-way $g^2$, in which is free to slide up and down a carrier $g^4$ having a cutter $g^5$, said carrier being connected to one end of a lever $g^6$ pivoted at $g^7$, on an upright portion of said slide $g$. The slide-bar $g$ is fitted to slide in suitable ways in a stand $g^8$, the foot of which is bolted to the top-plate $A^3$, said bar having a roller or other stud $g^9$ which enters a cam groove in a cam $g^{10}$ fast on the shaft $d^{15}$, before referred to. The slide $g$ is thrust forward with the cutters separated to embrace the wire, and as soon as the cutters are in position, the inner end of the lever $g^6$ is acted upon and moved by a lug $g^{12}$ carried by and projecting from one side of the cam $g^{10}$, and, the wire having been cut off, the cam $g^{10}$ acts to quickly retract the said slide-bar into its normal position.

The lever $e^4$ has its inner short end connected by an adjustable link $h$ with a lever $h'$ mounted upon a suitable stud $h^{20}$, said lever having connected to it a pinion $h^2$ which is engaged by the teeth of a rack-bar $h^3$ adapted to be slid in a suitable guide-way $h^4$ attached to the bed $A^2$, see Fig. 4, said rack having a suitable roller or other stud, which enters a cam groove at one side of a cam $h^5$ fast on a short shaft $h^6$, occupying a position somewhat below the shaft $d^{15}$, the shaft $h^6$ deriving its motion from a gear $h^7$ on the shaft $d^{15}$, which engages a gear $h^8$ on shaft $h^6$. The lever $f^2$ has its inner or short arm connected with the lever $h'$ by preferably an adjustable link $f^{20}$, so that said levers $e^4$ and $f^2$ are, during the reciprocation of the rack $h^3$, caused to move first toward and then away from each other quickly. The shaft $h^6$ has fast upon it near one end a worm toothed gear $h^9$, which engages a worm toothed gear $h^{10}$ fast on a shaft $h^{12}$, substantially at right angles to the shaft $h^6$, said shaft being mounted in suitable bearings, see Figs. 8 and 24, secured to the intermediate plate $A^\times$ fixed on suitable posts or studs erected on the table $A'$. The shaft $h^{12}$ is provided with a disk $h^{13}$ having at one side, see Fig. 20, a cam groove 425, which receives a roller or other stud 426, see dotted lines Fig. 8, projected from a lacing clamp actuator $h^{14}$, shown as a slide having a three-armed head, each arm being provided with a suitable beveled face, as $h^{15}$, $h^{16}$, $h^{17}$, said beveled faces acting at proper times upon the beveled lower ends of like bars $h^{18}$, there being two such bars, each adapted to slide up and down in suitable guide-ways of a lacing carrier $h^{19}$, herein shown as an oscillating carrier, secured to the upper end of a shaft $h^{20}$ having bearings on the table and bed, the said shaft having at its lower end, see Fig. 9, a gear $h^{21}$ which is engaged by the teeth of a toothed sector lever $h^{22}$, pivoted at $h^{23}$ on the table $A'$, the inner end of said sector lever having a suitable roller or other stud, which enters a cam groove in a cam $h^{24}$ fast on a shaft $h^{25}$ mounted in suitable bearings secured to said table, said sector lever oscillating said lacing carrier during the rotation of said shaft, so as to present one after another of its lacing holding clamps $h^{26}$, $h^{27}$, see Fig. 3, opposite the twisting device, in order that the lacing $l$ protruding from the said clamp may be grasped by said twisting device.

The oscillating carrier $h^{19}$ is provided in this instance of my invention with two lacing clamps $h^{26}$, $h^{27}$, so that when one or the other of said clamps is opposite the twisting device to be there provided with a wire tip, the other of said clamps may be opposite one of two like tip-cutting devices by which to cut off the end of a completed tip and insure uniform length therefor.

The tip-cutting devices are each composed essentially of a stationary blade $m$, see Figs. 1, $1^a$ and $1^b$, attached to a stand $m'$ supported upon the bed $A^2$, said blade having co-operating with it a movable blade $m^3$ attached to a blade carrier $m^4$ adapted to slide in suitable guide-ways in said stand, said carrier having jointed to it a link $m^5$ which is connected to one end of an elbow-lever $m^6$ pivoted at $m^7$ on a stand secured to the table $A'$, said blade carrier being normally depressed by a spring $m^8$, the rear ends of the like levers $m^6$ being acted upon at suitable times, one by a projection $m^9$ on a beveled gear $m^{10}$, fast on the shaft $h^{25}$, the other by a projection $m^{13}$ attached to a disk $m^{14}$ also secured to said shaft. The gear $m^{10}$, see Fig. 9, is engaged by a beveled gear $m^{12}$ on the shaft $A^4$ before described. The cam hub $h^{24}$ on shaft $h^{25}$ has two like cam wings $m^{15}$, which, in the rotation of said hub, strike a lever $m^{16}$, see Figs. 8 and 24, pivoted at $m^{17}$, causing said lever to act upon and move an elbow-lever $m^{18}$ pivoted at $m^{19}$, and connected to the clamp actuator $h^{14}$ by a suitable pin $m^{30}$, said lever $m^{18}$ moving forward the clamp actuator $h^{14}$, and imparting to it what I shall denominate as an auxiliary thrust, the stud 426 of the clamp actuator being at that time directly opposite the open throat $425^\times$ of the groove in the cam $h^{13}$, but the thrust imparted to the said actuator is not far enough to entirely remove the stud 426 from said throat and consequently the said cam, as it continues its rotation, meets the said stud and pulls the actuator back sufficiently to enable the main path of the cam to thereafter control the movement of the actuator, the particular time and object of these movements being hereinafter more fully described.

The lacing clamps are both alike, so I need describe but one of them, viz:—the one $h^{27}$, referring to Figs. 25 and 26, and 29 to 32 inclusive.

Each lacing clamp is composed of two jaws $n$, $n$, pivoted at $n^\times$ upon the carrier $h^{19}$. One jaw of each lacing clamp has at its forward end a projection or lip $n'$, see Fig. 29, which serves to support the lacing at the proper level while the lacing clamp is open. The rear ends of the jaws receive between them the wedge-shaped upper end,—see Fig. 33, which is an enlarged sectional detail in the line $y'$ Fig. 3,—of a bar $h^{18}$, which is elevated, as before described, whenever the jaws are to be closed upon a lacing, said bars having attached to their upper ends, in a suitable manner, a yoke $h^{18\times}$, which, as the bar $h^{18}$ is depressed, acts upon the outer sides of the rearwardly extended ends of said jaws, thus causing the clamp to be opened at the proper times, not only to permit the attendant to lay a lacing in position between the jaws, but also to enable a lacing provided with a tip to be removed from the clamp.

The particular bar $h^{18}$ holding the lacing clamp jaws closed opposite the twisting device is made to descend temporarily just after wire has been inserted through the holes $B^{10}$ of the twisting device and the lacing and just before the commencement of the twisting operation, to thus enable the bender, before described, to pass between the opposed faces of the lacing clamp to put into the wire the preliminary bend, indicated at $w^6$ Fig. 17, the portion 427 of the outer wall of the groove 425 then acting on the stud 426, and the bender having been operated to put the preliminary bend $w^6$ into the wire and having been withdrawn from between the jaws of the lacing clamp, the part 428, of said cam groove, acts on the stud 426 to again quickly thrust the said clamp actuator forward so that the cam $h^{16}$ thereof again acts upon the lower end of and lifts the bar $h^{18}$, then in line with it, to again effect the firm closing of the lacing clamp upon the lacing preparatory to the operation of the twisting device.

While one of the lacing clamps, for instance clamp $h^{26}$, see Fig. 3, is opposite the twisting device and holding the lacing and wire to be made into a tip by the twisting device, the other of said clamps, as for instance, clamp $h^{27}$, stands opposite one of the tip cutters, with the jaws of the clamp open, the lower end of the bar $h^{18}$ co-operating with the clamp $h^{27}$, being held down by a spring 430, and resting just beyond the cam $h^{17}$. As soon as the clamp opposite a tip cutter has been opened, said opening being effected after the cutting off of the tip, the attendant will remove the finished lacing and will lay in place of it, between the open clamp, the lacing next to be tipped, and this clamp must be closed upon this fresh lacing preparatory to the movement of the carrier $h^{19}$ to place the lacing clamp $h^{27}$ opposite the twisting device. The preliminary movement given to the clamp actuator $h^{14}$ by the lever $m^{18}$, before described, is to enable the incline $h^{17}$, referred to, to act upon and raise the bar $h^{18}$ of the lacing clamp $h^{27}$ to thus close the said clamp upon the fresh lacing, and enable said clamp to carry the lacing with it as the carrier $h^{19}$ is moved after the lacing held by the carrier $h^{26}$ has been tipped.

While the carrier $h^{19}$ is moving to put the clamp $h^{27}$ opposite the twisting device, the clamp actuator bar $h^{14}$ occupies such a position with relation to the lower ends of the bar $h^{18}$ that said bar rides over the arc shaped track 429, see Fig. 8, and the bar $h^{18}$ co-operating with the clamp $h^{27}$ is kept elevated, and the bar $h^{18}$ co-operating with the clamp $h^{26}$ is also kept elevated, and the tip projecting from the clamp $h^{26}$ has its outer end placed between the blades of the tip cutter and the latter is moved as described to cut off the outer end of the tip just about as the lower end of the bar $h^{18\times}$ reaches and slides down the incline $h^{15}$, under the action of spring 430, thus opening the clamp $h^{26}$ to enable the attendant to remove the finished lacing and substitute for it a fresh lacing, and thereafter, as before described, by a movement of the clamp actuator the incline $h^{15}$ thereof is made to raise the bar $h^{18}$ to close the clamp $h^{26}$ upon the fresh lacing, and the clamp $h^{27}$ left opposite the twisting device is temporarily opened, as before described, of the clamp $h^{26}$, to enable the benders to operate and bend the wire, after which the clamp is closed upon the lacing having the preliminary bend in the wire preparatory to the rotation of the twisting device to twist the wire in the form for the tip.

From the foregoing description it will be readily seen how the lacing clamps are brought one after the other into position to present a lacing to receive a wire to be twisted into a tip and then to have its tip end cut off to uniform length.

To accommodate for lacings of different thickness, the bar $h^{18}$ is made in two parts connected together by a suitable screw $h^{28}$ in a slot in one part of the said bar, and when said screw is loosened, the wedge-shaped top part of the bar may be adjusted on the lower part thereof by the adjusting screw or device $h^{18\times\times}$, and in this way the normal position to which the bar $h^{18}$ may be elevated may be changed so that the wedge will enter more or less between the rear ends of the jaws and so close the forward ends of the said jaws more or less closely to properly grasp the lacing whatever its thickness. The lower ends of the arms of the yoke $k^{18\times}$, when the bar $h^{18}$ is fully depressed enter suitable notches, see Fig. 33, in the carrier $h^{19}$, said notches preventing possible lateral twisting of the said yoke.

Power to operate the machine may be derived from a belt $n^{16}$ driven from any suitable source and going to a suitable pulley $n^{14}$, herein shown as of the friction variety, loose on the power shaft $n^{15}$ alongside of a suitable co-operating conical member $n^{14\times}$ splined on said shaft and under the control of a suitable shipper lever $n^{18}$, which may be operated when desired to stop the machine by or through a suitable treadle $n^{17}$. The power shaft $n^{15}$ has an attached pulley $n^{14}$ which drives a belt $n^{13}$ extended over the clutch pulley part $n^{12}$ loose on shaft $d^{15}$, and said power shaft also has, as shown, a sprocket wheel $r$, which, by chain $r'$ rotates the loose pulley part $r^2$.

The spindle B, and the shaft $d^{15}$ are rotated intermittingly and at different periods to effect the various operations herein alluded to at the desired relative times and in the established order, and to do this, the loose clutch pulley parts $n^{12}$ and $r^2$ must at times be permitted to run loose on their respective shafts, and at other times be connected operatively with said shafts, as I will now describe.

The crank $A^5$ has attached to it at its rear side a disk $n^3$, see Fig. 9, provided with a tappet $n^4$, shown also by dotted lines Fig. 2, which acts once during each revolution of the shaft $A^4$ upon one end of an elbow lever $n^5$ pivoted at $n^6$ on a suitable stand $n^{6\times}$, the upper end of said lever when moved by said tappet striking a clutch controller $n^7$ pivoted at $n^8$ and normally held by spring $n^9$ against said lever. The upper end of the clutch controller $n^7$ is bent to form a finger, see Fig. $2^b$, which enters a slot in the periphery of the clutch member $n^{10}$ fast on the shaft $d^{15}$ before referred to alongside of the continuously rotating pulley $n^{12}$ loose on said shaft and deriving its motion from a belt $n^{13}$, hereinbefore described, said finger, when put into the slot referred to, by the spring $n^9$, standing in the path of movement of the spring dog $n^{40}$, see Fig. $2^b$, and causing it to be disengaged from that one of the lugs or teeth $n^{41}$ of the pulley $n^{12}$ with which it may be in engagement, and the pulley $n^{12}$ will thereafter run loose on the shaft $d^{15}$ until the finger of the dog $n^7$ is drawn outwardly by movement of lever $n^5$, as in Fig. 2, thus letting the free end of the spring dog catch one of the stops $n^{41}$ of the driven pulley $n^{12}$. The pulley $n^{12}$ runs loose on the shaft $d^{15}$, so as to leave it at rest while the spindle B carrying the twisting device is being moved forward, and, the spindle having been moved forward until the twisting device is in position to grasp the lacing, the said clutch controller $n^7$ is moved away from the said clutch disk, letting the pulley $n^{12}$, then running loose, come into effective engagement with the disk $n^{10}$, and rotate the shaft $d^{15}$ to effect the release of the clutch $C^3$ from the collar $B^{14}$ and to then move the bender forward to put the preliminary bend into the wire, as described, and, the bender having been thrust forward and retracted by the lever $d^{12}$, the further rotation of the shaft $d^{15}$ is stopped by freeing the pulley $n^{12}$ from said shaft while the spindle B is being retracted and rotated to twist the wire and form a tip for the lacing. The main shaft $A^4$ has fast upon it one part $r^3$ of a clutch $r^3$, $r^2$, the part $r^2$ being loose, as stated, on the said shaft. In practice the clutch part $r^3$ will carry a spring dog as described with relation to the pulley $n^{10}$, and the loose clutch pulley part $r^2$ will contain in practice a series of stops, as provided for with relation to the loose pulley $n^{12}$. The part $r^3$ is also provided at one side with a projection $r^4$ having in it a groove, to be described. The clutch controller $n^7$ has extended therefrom at its lower end an arm $n^{7\times}$, see Figs. 1 and 9, provided with suitable bearings to receive a spring actuated bolt $o$. One end of the said bolt is normally projected by its operating spring beyond the inner end of said arm, so that when the said controller $n^7$ is moved by the spring $n^9$ to effect the release of the pulley $n^{12}$, and leave the shaft $d^{15}$ at rest, said bolt will act against the upper end of the auxiliary clutch lever $o'$ and will cause its lower end having a finger, as already described with relation to controller $n^7$, to retire from the part $r^3$ of the clutch pulley parts on the shaft $A^4$, and permit the dog carried thereby to engage, as described, a suitable projection on the continuously running part $r^2$, such coupling together of the parts $r^2$, $r^3$, causing the main shaft $A^4$ to be rotated to thereby effect the reciprocation of the rack bar $A^9$, hereinbefore described, the movement of which rotates the spindle B first in one and then in the other direction for the proper number of rotations, and at the same time causes the said shaft to be slid forward and backward as already provided for. At each rotation of the main shaft $A^4$, during which time the rack $A^9$ is actuated, the projection $r^4$ arrives opposite the end of a lever $o^4$, pivoted at $o^5$, and turns said lever so that its upper end, see Fig. 1, strikes a projection 310 extended from the bolt $o$ down to a slot in the arm $n^{7\times}$, and causes said bolt to be pushed back, thereby releasing the auxiliary clutch controller $o'$, so that when the lever $n^5$ is again moved as described, by the projection $n^4$, said bolt may pass the auxiliary controller $o'$ and not turn it upon its fulcrum. The shaft $A^4$ has given to it one complete rotation, while the shaft $d^{15}$ is at rest, and vice versa.

Prior to my invention I am not aware that lacings have ever been tipped by the use of wire twisted as described, and therefore this invention is not limited to the exact mechanism herein shown, as it will be obvious to one skilled in the art, that only by the exercise of mechanical skill and without invention, many of the parts might be altered and well known equivalents substituted therefor, so this invention is not limited to the particular mechanism employed for putting or threading the wire through the end of the lacing, nor to the particular form of twisting device shown, nor to the particular form of lacing clamp, nor to the particular device represented for opening and closing the jaws of the twisting device and reciprocating and rotating the spindle, nor to the particular device shown for opening and closing the lacing clamps, but rather my invention is intended to include and cover any mechanical equivalents for effecting the purpose stated, that of holding the lacing mechanically while the wire is being twisted automatically to constitute a tip. Nor is my invention in all instances limited to the automatic passing or threading of the wire, of a length sufficient for a tip, through the lacing held by the lacing clamp and through the openings $B^{10}$ in the twisting device, for it will be obvious that a very great saving could be effected in the production of wire tip lacings, even should the wire employed for the tips be given to the operator in separate pieces of suitable length and be, by the operator, put through the lacing by hand while held in the clamp and while the lacing was also between the substantially closed jaws of the twisting device of whatever form.

The bender is a most important feature of my invention, as it acts against the wire for the end substantially midway its extremities, and like a punch it bends the wire into the space between the jaws of the clamp which thus acts as a die recess, to make a preliminary bend close to the sides of the lacing and define points from which the twisting of the wire shall start and the clamp thereafter clamps not only the lacing but also the wire for the end at the point where it is passed through the lacing.

Having described my invention, what I claim as new, and desire to secure by Letters Patent, is—

1. In a machine for putting tips upon lacings, the following instrumentalities, viz:—a clamp to hold a lacing, and devices to put but one end of a tip forming wire through said lacing in position to be twisted to form a tip, substantially as described.

2. In a machine for putting tips upon lacings, the following instrumentalities, viz:—a clamp to hold a lacing, devices to put but one end of a wire through said lacing while held in said clamp, and devices to sever the wire between the lacing and the source of supply of the wire, substantially as described.

3. In a machine for putting tips upon lacings, the following instrumentalities, viz:—a clamp to hold a lacing, a wire feeding device to thrust but one end of a wire through a lacing, and a wire pulling device to engage the end of said wire and draw it farther through the lacing, substantially as described.

4. In a machine for putting tips upon lacings, the following instrumentalities, viz:—a clamp to hold a lacing, and a wire feeding device to thrust but one end of a wire through said lacing, a wire pulling device, to engage the end of said wire and pull it farther through said lacing, and cutting mechanism to sever the wire preparatory to twisting the same to form a tip, substantially as described.

5. In a machine for putting tips upon lacings, the following instrumentalities, viz:—a clamp to hold a lacing, devices to provide said lacing with a wire of a length to form a tip, and a twisting device to engage the wire at each side of said lacing and twist it to form a tip, substantially as described.

6. In a machine for putting tips upon lacings, the following instrumentalities, viz:—a clamp to hold a lacing, devices to supply the lacing with a wire, wire cutting mechanism to sever the wire into proper lengths, and a twisting device to operate substantially as described.

7. In a machine for putting tips upon lacings, the following instrumentalities, viz:—a lacing clamp, a rotating wire twisting device, and devices to grasp parts of the tip wire close to each side of the lacing, and devices to separate the twisting device from the said clamp during the operation of twisting said tip about the end of the lacing, substantially as described.

8. In a machine for putting tips upon lacings, the following instrumentalities, viz:—a lacing clamp; a rotating wire twisting device; devices to change the relative positions of the said clamp and twisting device during the twisting operation; a wire feeding device to thrust the end of the wire through the lacing, a wire pulling device to engage the end of the wire thrust through the lacing and draw it from the wire feeding device; and wire cutting mechanism; substantially as described.

9. In a machine for putting tips upon lacings, the following instrumentalities, viz:—a lacing clamp; a rotating wire twisting device; devices to change the relative positions of the said clamp and twisting device during the twisting operation, a wire feeding device to thrust the end of the wire through the lacing, and a wire pulling device having a dog to engage the end of the wire thrust through the lacing and draw it from the wire feeding device, combined with a releasing device to effect the release of the dog of the wire pulling device from the wire; substantially as described.

10. In a machine for putting tips upon lacings, the following instrumentalities, viz:—a clamp; a rotating wire twisting device, and a bender carried thereby, the bender acting to bend between its extremities the wire held in the clamp for the tip, the said lacing and wire being held firmly during the action of the twisting device, substantially as described.

11. In a machine for providing lacings with wire tips, a clamp to hold the lacing, combined with a rotating wire twisting head having arms provided with holes through which the wire is threaded preparatory to being twisted, substantially as described.

12. In a machine for providing lacings with wire tips, a clamp to hold the lacing, combined with a rotating wire twisting device having arms provided with guides or holes through which the wire is threaded, and with a bender to provide the wire with a preliminary bend at its junction with the lacing preparatory to twisting the wire to form a tip, substantially as described.

13. In a machine for providing lacings with wire tips, a clamp to hold the lacing, and a rotating wire twisting device composed of two arms pivoted together and adapted to grasp the lacing between them, combined with a device to keep the lacing-holding arms of the twisting device closed while twisting the wire to form a tip, substantially as described.

14. In a machine for providing lacings with wire tips, a wire twisting device composed of pivoted movable jaws, and a threaded rotatable spindle carrying said jaws, combined with a threaded nut co-operating with threads of said threaded spindle to effect the reciprocation of said spindle and said twisting device while the spindle is being rotated, substantially as described.

15. In a machine for providing lacings with wire tips, a wire twisting device composed of movable jaws pivoted upon an externally threaded spindle, and a relatively stationary nut to embrace the threaded parts of said spindle, combined with means to rotate said spindle first in one and then in the other direction, to operate, substantially as and for the purpose described.

16. In a machine for providing lacings with wire tips, a wire twisting device composed of two movable jaws pivoted upon a rotatable spindle, combined with devices carried by said spindle to positively close said jaws upon a lacing during the twisting operation, substantially as described.

17. In a machine for providing lacings with wire tips, a rotatable and longitudinally movable spindle, and a wire twisting device composed of movable jaws pivoted thereon, combined with a sliding collar $B^{14}$ connected with the said jaws by links, and with a catch to arrest said collar and open said jaws during the longitudinal movement of the spindle in one direction, substantially as described.

18. In a machine for providing lacings with wire tips, a rotatable and longitudinally movable spindle, a wire twisting device composd of movable jaws pivoted thereon, having openings for the reception of the wire and a sliding collar $B^{14}$ on said spindle, combined with a device to act against one end of said collar and slide the same longitudinally upon or with relation to said spindle to effect the holding together of the jaws of the twisting device, for the purposes set forth.

19. In a machine for providing lacings with wire tips, a longitudinally movable and rotatable spindle having mounted upon it movable jaws constituting a twisting device, combined with a bender carried by said twisting device, slide bars $d^4$ operatively connected to said bender, and devices to actuate said slide bars to operate the bender, substantially as described.

20. In a machine for providing lacings with wire tips, a lacing clamp to hold a lacing, a rotatable and reciprocable hollow spindle having pivoted upon it jaws to constitute a twisting device, said jaws being grooved at their inner sides, and a bender fitted to slide between the said jaws, combined with devices to reciprocate said bender with relation to said jaws and project said bender from between said jaws into the space between the jaws of the lacing clamp then holding the lacing, said bender bending the tip wire in said clamp preparatory to twisting said wire to form a tip, substantially as described.

21. The hollow spindle and its attached twisting device having jaws provided with openings $B^{10}$ for the reception of the wire, and feeding mechanism to feed a wire through said openings and through the lacing then between the jaws of the twisting device, combined with a plunger to act upon a secant surface carried by said spindle and position the spindle with the openings $B^{10}$ in its jaws in line with the wire, substantially as described.

22. In a machine for providing lacings with wire tips, a twisting device having holes or openings to receive and guide a wire being threaded through a lacing, combined with a clamp carrier having a plurality of lacing clamps, and with devices to move said carrier to place one and then another of said clamps provided with a lacing opposite the said twisting device, substantially as described.

23. In a machine for providing lacings with wire tips, a twisting device to engage a wire threaded into the end of a lacing, and a clamp carrier having a plurality of jaw-like lacing clamps, and devices to move said carrier to place one and then another of said clamps with a lacing opposite said twisting device, combined with devices to automatically close said lacing clamps, substantially as described.

24. In a machine for providing lacings with wire tips, a twisting device to engage a wire threaded into the end of a lacing, and a clamp carrier having a plurality of jaw-like lacing clamps, and devices to move said carrier to place one and then another of said clamps with a lacing opposite said twisting device, combined with devices to automatically open said lacing clamps, substantially as described.

25. In a machine for providing lacings with wire tips, a twisting device to engage a wire threaded into the end of a lacing, and a clamp carrier having a plurality of jaw-like lacing clamps, and devices to move said carrier to place one and then another of said clamps with a lacing opposite said twisting device, combined with devices to automatically close and open said lacing clamps, substantially as described.

26. In a machine for providing a lacing with a wire tip, a movable carrier having a plurality of lacing clamps, means to move said carrier, and devices to thread a wire through a lacing while held by one of said clamps, combined with a twisting device adapted to engage said wire and twist the same to form a tip, substantially as described.

27. In a machine for providing a lacing with a wire tip, a movable carrier having a plurality of lacing clamps, means to move said carrier, devices to thread a wire through a lacing while held by one of said clamps, and a twisting device adapted to engage said wire and twist the same to form a tip, combined with cutting devices to cut the twisted wire tips to uniform length, substantially as described.

28. In a machine for providing lacings with wire tips, a lacing clamp composed of jaws, one of which has a finger or projection to sustain the lacing when the acting ends of the jaws are open, substantially as described.

29. In a machine for providing lacings with wire tips, a carrier, a lacing clamp mounted thereon and composed of jaws, a wedge bar, and devices to adjust the same substantially as described, to adapt the clamp to hold lacings of different thickness.

30. In a machine for providing lacings with wire tips, a carrier, a lacing clamp mounted thereon composed of jaws, combined with devices to positively open and to positively close said jaws, substantially as described.

31. In a machine for providing lacings with wire tips, a wire feeding device, a wire pulling device having a dog to grasp the free end of the wire presented to it by the wire feeding device, and means to simultaneously move said wire feeding and wire pulling devices toward and then away each from the other, substantially as described.

32. The herein described method of providing lacings with wire tips which consists in passing the tip making wire through the lacing near its end, bending the wire sharply close to each side the lacing to thereby establish the points at which the wire outside the lacing shall commence to twist, and thereafter twisting closely together the wire legs at each side the lacing to form a taper-pointed tip, substantially as shown and described.

In testimony whereof I have signed my name to this specification in the presence of two subscribing witnesses.

SAMUEL LEE PRATT.

Witnesses:
GEO. W. GREGORY,
EMMA J. BENNETT.